United States Patent
Hou et al.

(10) Patent No.: US 10,969,514 B1
(45) Date of Patent: Apr. 6, 2021

(54) METHOD FOR CORRECTING PERMEABILITY MODEL OF POROUS MEDIUM IN DISSOCIATION PROCESS OF GAS HYDRATE, AND METHOD AND SYSTEM FOR DETERMINING PERMEABILITY OF HYDRATE-BEARING POROUS MEDIUM

(71) Applicant: CHINA UNIVERSITY OF PETROLEUM (EAST CHINA), Shandong (CN)

(72) Inventors: Jian Hou, Qingdao Shandong (CN);
Yunkai Ji, Qingdao Shandong (CN);
Qingjun Du, Qingdao Shandong (CN);
Yongge Liu, Qingdao Shandong (CN);
Kang Zhou, Qingdao Shandong (CN);
Yueliang Liu, Qingdao Shandong (CN);
Bei Wei, Qingdao Shandong (CN);
Ermeng Zhao, Qingdao Shandong (CN); Nu Lu, Qingdao Shandong (CN);
Yajie Bai, Qingdao Shandong (CN)

(73) Assignee: CHINA UNIVERSITY OF PETROLEUM (EAST CHINA), Shandong (CN)

( * ) Notice: Subject to any disclaimer, the term of this patent is extended or adjusted under 35 U.S.C. 154(b) by 0 days.

(21) Appl. No.: 17/015,896

(22) Filed: Sep. 9, 2020

(51) Int. Cl.
*G01V 3/38* (2006.01)
*G01V 3/32* (2006.01)
(Continued)

(52) U.S. Cl.
CPC .................. *G01V 3/38* (2013.01); *G01V 3/32* (2013.01); *G01V 99/005* (2013.01); *G06F 30/28* (2020.01); *G06F 2113/08* (2020.01)

(58) Field of Classification Search
CPC .......... G01V 3/38; G01V 3/32; G01V 99/005; G06F 30/28; G06F 2113/08
See application file for complete search history.

(56) References Cited

PUBLICATIONS

Chen et al., New Insights on Water-Gas Flow and Hydrate Decomposition Behaviors in Natural Gas Hydrates Deposits with Various Saturations, Available Online Nov. 22, 2019, Applied Energy 259 (2020), 11 pp. (Year: 2019).*

(Continued)

*Primary Examiner* — Toan M Le
(74) *Attorney, Agent, or Firm* — Calfee Halter & Griswold LLP

(57) ABSTRACT

The application relates to the technical field of oil and gas field development, and discloses a correction method and system for a permeability model considering gas hydrate distribution, and a method and system for determining the permeability of the hydrate-bearing porous medium. The correction method includes: calculating a water mass and a hydrate saturation of each subregion of a porous medium in a dissociation process of a gas hydrate; calculating an average permeability of the porous medium in the dissociation process of the gas hydrate according to the hydrate saturation and a permeability model, wherein a value of a permeability characteristic parameter in the permeability model is an initial value of the permeability characteristic parameter; and determining the initial value of the permeability characteristic parameter as an optimal value of the permeability characteristic parameter under a condition that an difference between the average permeability of the porous medium and an actually measured permeability in the dissociation process of the gas hydrate is less than or equal to a preset value. In the application, through the corrected permeability model, the permeability characteristics of the porous medium considering the heterogeneous distribution of the hydrate can be accurately measured.

9 Claims, 7 Drawing Sheets

(51) Int. Cl.
*G06F 30/28* (2020.01)
*G01V 99/00* (2009.01)
*G06F 113/08* (2020.01)

(56) References Cited

PUBLICATIONS

Ji, et al., "Study on the Effects of Heterogeneous Distribution of Methane Hydrate on Permeabilityof Porous Media Using Low-Field NMR Technique" Journal of Geophysical Research: Solid Earth, 125, e2019JB01572. https://doi.org/10.1029/2019JB01572, 2020, pp. 1-17, accepted article online Feb. 7, 2020.

\* cited by examiner

METHOD FOR CORRECTING PERMEABILITY MODEL OF POROUS MEDIUM IN DISSOCIATION PROCESS OF GAS HYDRATE, AND METHOD AND SYSTEM FOR DETERMINING PERMEABILITY OF HYDRATE-BEARING POROUS MEDIUM

FIELD OF THE INVENTION

The application relates to the technical field of oil and gas field development, and particularly relates to a correction method for a permeability model and system, and a method and system for determining the permeability of a hydrate-bearing porous medium.

BACKGROUND OF THE INVENTION

Due to the advantages of high energy density, abundant reserves, cleanness and environmental protection, and the like, a natural gas hydrate has become a promising energy source in this century, and has attracted great attention from many countries and regions in the world. However, it is difficult to develop the natural gas hydrate reservoirs economically and effectively.

Because the coring operation has disadvantages of difficulty and high cost, the number of natural core samples is extremely limited. It is necessary to carry out indoor experimental researches on gas hydrate formation and permeability measurement in the porous medium. Permeability, as an important parameter for characterizing the seepage characteristics of the porous medium, has become a hot topic that has been widely studied. At present, the permeability test experiments of the porous medium during the gas hydrate dissociation usually regard the distribution of the gas hydrate in the porous medium as homogeneous distribution. However, through a large number of studies, the inventor has found that the distribution of the gas hydrate formed in the laboratory is usually heterogeneous in the porous medium (as shown in FIG. 4(e)), and the heterogeneous distribution of the gas hydrate will make the permeability of different parts in the porous medium vary greatly. Therefore, the permeability model measured based on the assumption of homogeneous distribution will have great errors.

SUMMARY OF THE INVENTION

An objective of the application is to provide a correction method and system for a permeability model, and a method and system for determining the permeability of the hydrate-bearing porous medium, wherein the permeability model is corrected by considering the influence of the heterogeneous distribution of a gas hydrate in the porous medium on the permeability model, so that the permeability characteristics of the porous medium can be accurately measured by the corrected permeability model, and its practicability is strong.

In order to achieve the above objective, a first aspect of the application provides a correction method for a permeability model, which includes: calculating the water mass of each subregion of a porous medium during a gas hydrate dissociation according to a relationship model between a signal intensity of a magnetic resonance imaging and water mass of the porous medium during a gas hydrate formation and a signal intensity of a magnetic resonance imaging of each subregion of the porous medium during the gas hydrate dissociation; calculating the hydrate saturation of each subregion of the porous medium during the gas hydrate dissociation, according to the water mass of each subregion of the porous medium during the gas hydrate dissociation and the initial saturated water mass of each subregion of the porous medium; calculating the average permeability of the porous medium during the gas hydrate dissociation according to the hydrate saturation of each subregion of the porous medium during the gas hydrate dissociation and a permeability model, wherein the value of a permeability characteristic parameter in the permeability model is an initial value of the permeability characteristic parameter; and determining the initial value of the permeability characteristic parameter as an optimal value of the permeability characteristic parameter under the condition that the difference between the average permeability of the porous medium and the actually measured permeability during the gas hydrate dissociation is less than or equal to a preset value.

Optionally, wherein after the step of calculating an average permeability of the porous medium during the gas hydrate dissociation, the correction method further comprises: correcting the value of the permeability characteristic parameter to obtain a corrected permeability model, under a condition that the difference between the average permeability of the porous medium and the actually measured permeability during the gas hydrate dissociation is larger than the preset value; calculating the average permeability of the porous medium during the gas hydrate dissociation according to the hydrate saturation of each subregion of the porous medium during the gas hydrate dissociation and the corrected permeability model; and determining the corrected value of the permeability characteristic parameter as the optimal value of the permeability characteristic parameter, under the condition that the difference between the average permeability of the porous medium and the actually measured permeability during the gas hydrate dissociation is less than or equal to the preset value.

Optionally, wherein the signal intensity of the magnetic resonance imaging of each subregion of the porous medium during the gas hydrate dissociation is obtained by the following manner, wherein the porous medium is theoretically divided into i regions along the transverse direction of its cross section, j regions along the longitudinal direction of its cross section, and N regions along its axial direction: acquiring first magnetic resonance images of the N regions of the porous medium during the gas hydrate dissociation, wherein imaging orientations of the first magnetic resonance images are the cross section of the porous medium, and the first magnetic resonance image of each of the N regions is divided into i*j subregions; acquiring a second magnetic resonance image of the porous medium during the gas hydrate dissociation, wherein an imaging orientation of the second magnetic resonance image is a sagittal plane, the second magnetic resonance image is divided into N regions, wherein each region has i subregions, and imaging parameters of the second magnetic resonance image are the same as those used in a second magnetic resonance image involved in the formation process of the gas hydrate; and assigning the signal intensity of the magnetic resonance imaging of each subregion in the second magnetic resonance imaging onto j subregions of the first magnetic resonance image, wherein j subregions of the first magnetic resonance image are corresponding to each subregion in the N regions of the second magnetic resonance image, according to an ratio of magnetic resonance imaging signal intensities of the j subregions, so as to acquire the signal intensity of the magnetic resonance imaging of each subregion of the porous medium during the gas hydrate dissociation.

Optionally, wherein the step of calculating the average permeability of the porous medium during the gas hydrate dissociation comprises: calculating the permeability of each subregion in each region of the porous medium during the gas hydrate dissociation, according to the hydrate saturation of each subregion of the porous medium during the gas hydrate dissociation and the permeability model; calculating the average permeability of each region, according to the permeability of each subregion in each region of the porous medium; and calculating the average permeability of the porous medium, according to the average permeability of each region.

Optionally, wherein the step of calculating the average permeability of each region comprises: calculating the average permeability $\bar{k}_n$ of any one region n of the N regions according to the following formula, $$\bar{k}_n = \frac{\sum_{t=1}^{t=j}\sum_{s=1}^{s=i} k_{nst} A_{nst}}{\sum_{t=1}^{t=j}\sum_{s=1}^{s=i} A_{nst}},$$

wherein $k_{nst}$ is the permeability of the subregion at row s and column t on the cross section of the region n, and $A_{nst}$ is an area of the subregion at row s and column t on the cross section of the region n; and/or the step of calculating the average permeability of the porous medium comprises: calculating the average permeability $\bar{k}$ of the porous medium according to the following formula, $$\bar{k} = \frac{L}{\sum_{n=1}^{N} \frac{L_n}{k_n}},$$

wherein $L_n$ is the longitudinal length of the porous medium in the region n, and L is the longitudinal length of the porous medium.

Optionally, wherein before the step of calculating the water mass of each subregion of the porous medium during the gas hydrate dissociation is performed, the correction method further comprises: determining a changing rule of the water mass of the porous medium with time according to transverse relaxation time distributions of the porous medium during the gas hydrate formation; determining a changing rule of the signal intensity of the second magnetic resonance imaging of the porous medium with time, according to the magnetic resonance images of the porous medium during the gas hydrate formation, wherein an imaging orientation of the second magnetic resonance imaging is a sagittal plane; and determining the relationship model between the signal intensity of the second magnetic resonance imaging and the water mass of the porous medium during the gas hydrate formation, according to the changing rule of the water mass of the porous medium with time and the changing rule of the signal intensity of the second magnetic resonance imaging of the porous medium with time.

Optionally, wherein the step of determining the changing rule of the water mass of the porous medium with time comprises: determining the changing rule of the water mass of the porous medium with time during the gas hydrate formation, according to the transverse relaxation time distributions of the porous medium measured at different times under the gas hydrate formation pressure during the gas hydrate formation and a relational expression between the water mass of standard samples and a total signal intensity of transverse relaxation time distribution of the standard samples, under a condition that the gas involved in the formation process of the gas hydrate does not contain a protium atom; or determining the changing rule of the water mass of the porous medium with time, according to the relational expression between the water mass of standard samples and the total signal intensity of transverse relaxation time distribution of the standard samples, the transverse relaxation time distributions of the porous medium measured at any one time in a preset time period when the porous medium starts to produce gas under an atmospheric pressure, and the transverse relaxation time distributions of the porous medium measured at different times under the gas hydrate formation pressure during the gas hydrate formation, under a condition that the gas involved in the formation process of the gas hydrate contains the protium atom.

Optionally, wherein the step of determining the changing rule of the water mass of the porous medium with time under the condition that the gas involved in the formation process of the gas hydrate contains the protium atom comprises: determining a gas calibration coefficient b, according to the relational expression between the water mass of standard samples and the total signal intensity of transverse relaxation time distribution of the standard samples, the transverse relaxation time distribution of the porous medium measured at any one time in the preset time period when the porous medium starts to produce gas under the atmospheric pressure, the initial transverse relaxation time distribution of the porous medium measured under a gas hydrate generation pressure during the gas hydrate formation and the following formula, $$b = \frac{m_{w1} - aI_1}{\rho_w(I_2 - I_1)} b = \frac{m_{w1} - aI_1}{\rho_w(I_2 - I_1)},$$

wherein $m_{w1}$ is an initial saturated water mass of the porous medium, a is a water calibration coefficient in the relational expression, $\rho_w$ is a density of water, $I_1$ is a total signal intensity of the transverse relaxation time distribution of the porous medium measured at any one time in the preset time period when the porous medium starts to produce gas under the atmospheric pressure, and $I_2$ is a total signal intensity of the transverse relaxation time distribution of the porous medium measured for the first time under the gas hydrate generation pressure during the gas hydrate formation; and determining the changing rule of water mass of the porous medium with time, according to the water calibration coefficient, the gas calibration coefficient, the transverse relaxation time distributions of the porous medium measured at different times under the gas hydrate formation pressure during the gas hydrate formation and the following formula, $$m_{wf} = \left(\frac{124 m_{w1}}{108\rho_h} + bI_f - 1\right) / \left(\frac{124}{108\rho_w} + \frac{b}{\alpha} - \frac{1}{\rho_w}\right),$$

wherein $m_{wf}$ is the water mass of the porous medium during the gas hydrate formation, $I_f$ is the total signal intensity of the transverse relaxation time distribution of the porous medium measured at different times under the gas hydrate formation pressure during the gas hydrate formation, and $\rho_h$ is a density of the gas hydrate.

Optionally, wherein the step of calculating the hydrate saturation of each subregion of the porous medium during the gas hydrate dissociation comprises: calculating the hydrate saturation of each subregion of the porous medium during the gas hydrate dissociation according to the following formula, $$S_{hi} = 1 - \frac{m_{wi}}{m_{w0i}},$$

wherein $S_{hi}$ is a hydrate saturation of a ith subregion during the gas hydrate dissociation, $m_{wi}$ is a water mass of the ith subregion in the decomposition processes of the gas hydrate, and $m_{w0i}$ is an initial saturated water mass of the ith subregion.

Through the aforementioned technical solution, in the application, the correction method first calculates the water mass of each subregion of the porous medium during the gas hydrate dissociation, then calculates the hydrate saturation of each subregion of the porous medium during the gas hydrate dissociation, then calculates the average permeability of the porous medium during the gas hydrate dissociation according to the hydrate saturation of each subregion of the porous medium during the gas hydrate dissociation and the permeability model, and finally determines the initial value of the permeability characteristic parameter as the optimal value of the permeability characteristic parameter when the difference between the average permeability of the porous medium and the actually measured permeability during the gas hydrate dissociation is less than or equal to the preset value. That is to say, the correction method corrects the permeability model by considering the influence of the heterogeneous distribution of the gas hydrate in the porous medium on the permeability model, so that the permeability characteristics of the porous medium can be accurately measured by the corrected permeability model, and the practicability is strong.

A second aspect of the application provides a method for determining the permeability of the hydrate-bearing porous medium, which includes: acquiring a corrected permeability model according to the correction method for a permeability model; and determining the permeability of the porous medium according to the corrected permeability model, the average hydrate saturation of the porous medium during gas hydrate dissociation and the initial permeability of the porous medium.

Through the aforementioned technical solution, in the application, the method for determining the permeability of the porous medium creatively acquires the corrected permeability model based on the correction method for a permeability model, and then determines the permeability of the porous medium based on the corrected permeability model and the hydrate saturation of the porous medium during the gas hydrate dissociation, so that the permeability characteristics of the porous medium can be accurately measured by the corrected permeability model, and the practicability is strong.

A third aspect of the application provides a correction system for a permeability model, which includes: a water mass calculation device, configured to calculate the water mass of each subregion of a porous medium during a gas hydrate dissociation according to a relationship model between the signal intensity of the magnetic resonance imaging and water mass of the porous medium during a gas hydrate formation and the signal intensity of the magnetic resonance imaging of each subregion of the porous medium during the gas hydrate dissociation; a saturation calculation device, configured to calculate the hydrate saturation of each subregion of the porous medium during the gas hydrate dissociation according to the water mass of each subregion of the porous medium during the gas hydrate dissociation and the initial saturated water mass of each subregion of the porous medium; a permeability calculation device, configured to calculate the average permeability of the porous medium during the gas hydrate dissociation according to the hydrate saturation of each subregion of the porous medium during the gas hydrate dissociation and a permeability model, wherein the value of a permeability characteristic parameter in the permeability model is an initial value of the permeability characteristic parameter; and an optimal value determining device, configured to determine the initial value of the permeability characteristic parameter as an optimal value of the permeability characteristic parameter under the condition that the difference between the average permeability of the porous medium and the actually measured permeability during the gas hydrate dissociation is less than or equal to a preset value.

Details and advantages of the correction system for the permeability model can be found in the description of the aforementioned correction method for a permeability model, and will not be repeated here.

A fourth aspect of the application provides a system for determining the permeability of the hydrate-bearing porous medium, which includes: the correction system for a permeability model, configured to acquire a corrected permeability model; and a permeability determination device, configured to determine the permeability of the porous medium according to the corrected permeability model, the average hydrate saturation of the porous medium during the gas hydrate dissociation and the initial permeability of the porous medium.

Details and advantages of the system for determining the permeability of a porous medium can be found in the description of the aforementioned method for determining the permeability of a porous medium, and they will not be repeated here.

A fifth aspect of the application provides a machine-readable storage medium, storing an instruction which is used to enable a machine to execute the correction method for a permeability model and/or the method for determining the permeability of a porous medium.

Other features and advantages of embodiments of the application will be described in detail in the detailed description section that follows.

BRIEF DESCRIPTION OF DRAWINGS

Accompanying drawings are intended to further understand the present invention, construct one part of the description and explain the present invention together with embodiments described as below, rather than to limit the present invention. In the accompanying drawings.

Figure 1:
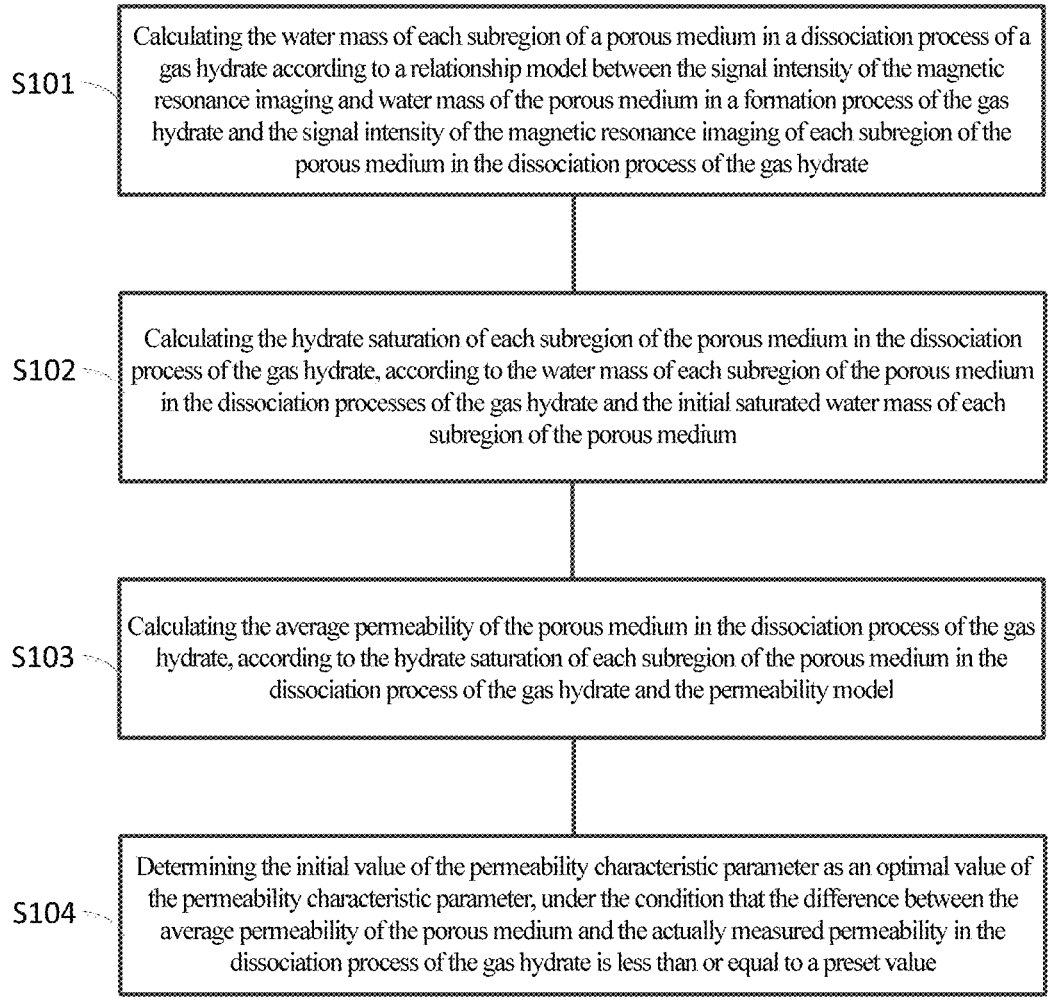
FIG. 1 is a flowchart of a correction method for a permeability model provided by an embodiment of the application.

DESCRIPTION OF REFERENCE NUMERALS 1, high-pressure pump, 2-1, first high-pressure piston container, 2-2, second high-pressure piston container, 3, temperature and pressure control system, 4, reaction chamber, 5, low-field magnetic resonance analyzer, 6, magnetic resonance imager, 7-1, first valve, 7-2, second valve, 7-3, third valve, 7-4, fourth valve, 8-1, first pressure sensor, 8-2, second pressure sensor, 9, temperature sensor, 10, computer (for storing and analyzing data such as temperature and pressure), 11, back-pressure valve, 12, manual pump, 20, water mass calculation device, 30, saturation calculation device, 40, permeability calculation device, 50, optimal value determining device, 100, correction system, and 200, permeability determination device.

DETAILED DESCRIPTION OF THE EMBODIMENTS

The detailed description of the application will be described in detail hereafter in connection with drawings. It should be understood that, the detailed description described here are only intended to illustrate and explain the application, rather than limiting the application.

Before introducing each specific embodiment of the application, the design idea of the application will be briefly explained. The main flow of a method for measuring the permeability of the porous medium during the gas hydrate dissociation (i.e. the permeability of the hydrate-bearing porous medium) involved in the application includes: a stage of determining the measurement parameters of a low-field magnetic resonance imaging experiment and calibrating a transverse relaxation time ($T_2$) distribution signal (i.e., a first stage), a stage of forming the gas hydrate (i.e., a second stage), a stage of dissociating the gas hydrate and measuring the permeability of the porous medium (i.e., a third stage), and a stage of processing data (i.e., a fourth stage).

The stage of determining the measurement parameters of a low-field magnetic resonance imaging experiment and calibrating a $T_2$ distribution signal mainly includes the following experimental process.

Figure 3:
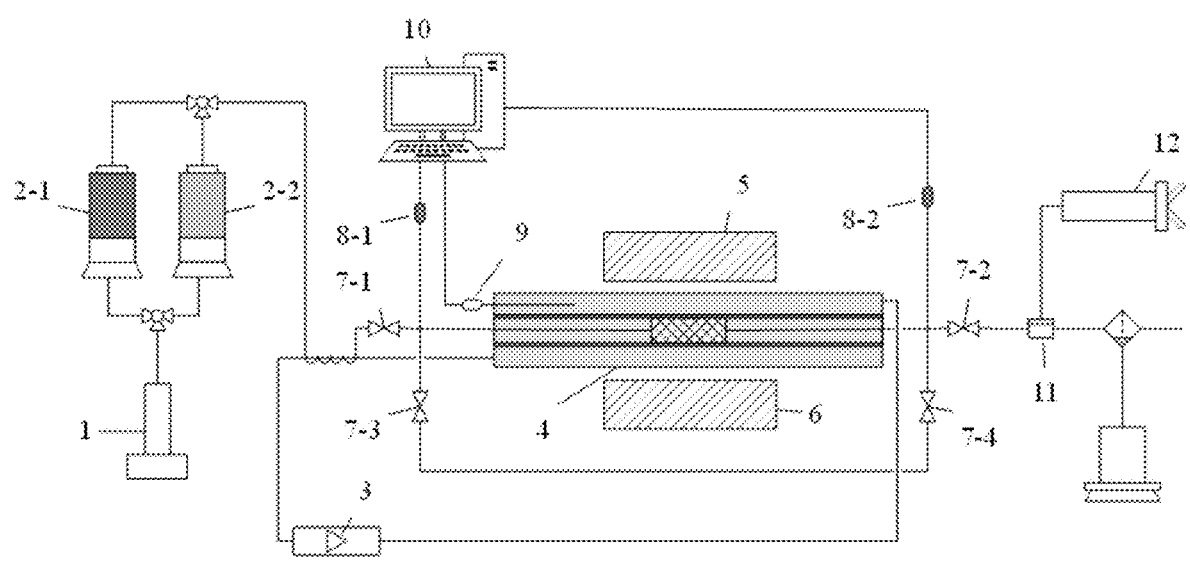
FIG. 3 is a schematic diagram of a system for measuring the permeability provided by an embodiment of the application.

Step 1-1: the temperature in a reaction chamber 4 (as shown in FIG. 3) is set as the gas hydrate formation temperature (i.e., the temperature required for formation of the gas hydrate) by the temperature and pressure control system 3 (as shown in FIG. 3).

Step 1-2: the measurement parameters required by a low-field magnetic resonance analyzer 5 (as shown in FIG. 3) for measuring the $T_2$ distribution of the porous medium in a water-saturated state (which can be simply referred to as the water-saturated porous medium) are determined. The initial saturated water mass of the porous medium (i.e., the initial water mass of the water-saturated porous medium or the maximum mass of the water which can be absorbed by the porous medium before the experiment of gas hydrate formation is performed) is $m_{w1}$.

Step 1-3: the $T_2$ distributions of standard samples are measured, and a water calibration coefficient a in a relational expression (1) between the water mass of the porous medium (i.e. the mass of the water contained in the porous medium) and the total signal intensity of the transverse relaxation time distribution (i.e. the sum of the signal intensity corresponding to each T2 in the $T_2$ distribution) is determined by fitting the total signal intensity of the $T_2$ distribution and water mass of the standard sample:

$$m_w = aI, \qquad (1)$$

wherein $m_w$ is the water mass (it is known) of the standard sample, and I is the total signal intensity of the $T_2$ distribution.

Step 1-4: a water-saturated porous medium is placed in the reaction chamber 4, a difference between the confining pressure and the pressure across the left and right ends (i.e., a pore pressure) of the reaction chamber 4 is set by the temperature and pressure control system 3, and the $T_2$ distribution of the water-saturated porous medium is measured; then the water mass $m_{w2}$ of the water-saturated porous medium is calculated according to the formula (1), the calculated water mass $m_{w2}$ is compared with the actual water mass $m_{w1}$, and if the deviation between the two is relatively small, the step 1-5 proceeds; otherwise, the step 1-2 is re-performed to re-determine the measurement parameters, and the steps 1-3 and 1-4 are performed.

Figure 4:
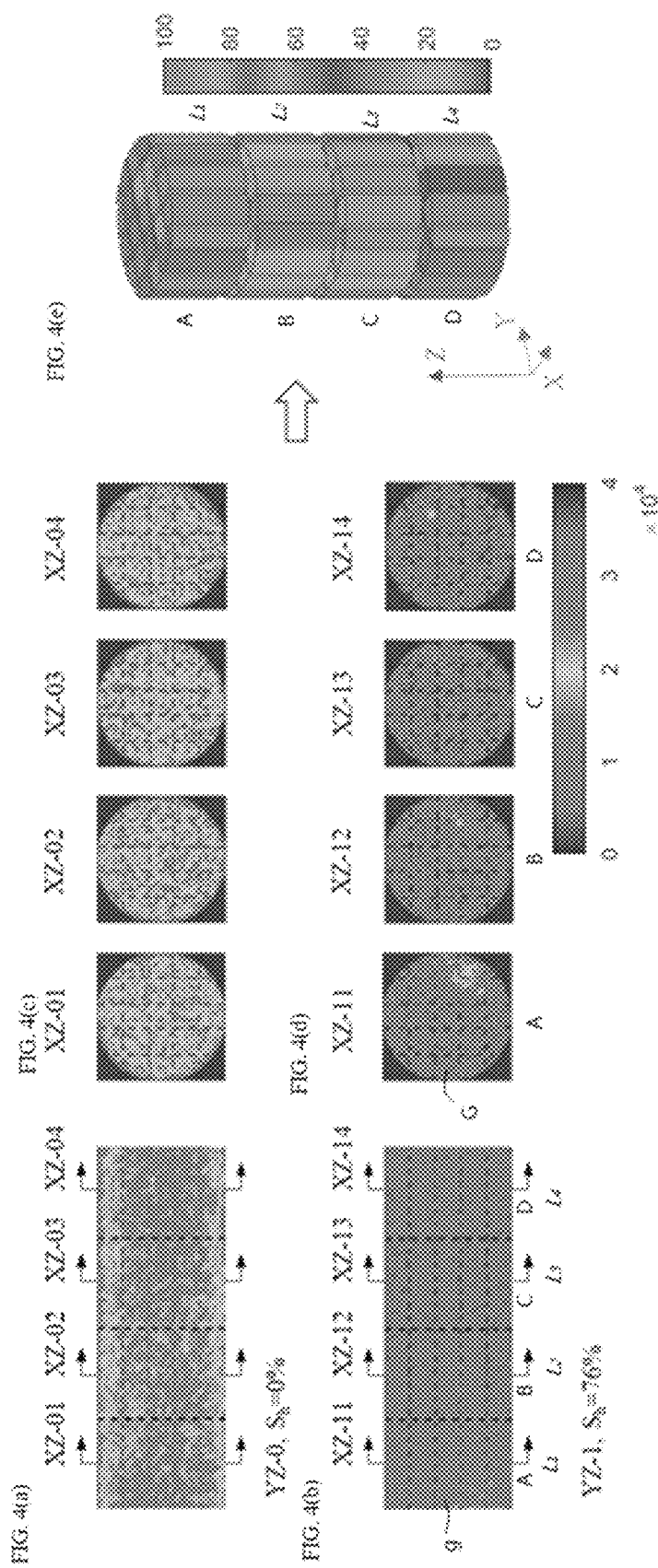
FIG. 4(a) is a schematic diagram of a magnetic resonance image on a sagittal plane of a water-saturated porous medium provided by an embodiment of the application.
FIG. 4(b) is a magnetic resonance image on a sagittal plane of a porous medium during the gas hydrate dissociation provided by an embodiment of the application.
FIG. 4(c) is magnetic resonance images on a cross section of a water-saturated porous medium provided by an embodiment of the application.
FIG. 4(d) is magnetic resonance images on a cross section of a porous medium during the gas hydrate dissociation provided by an embodiment of the application.
FIG. 4(e) is a schematic diagram of distribution of the gas hydrate in the porous medium during the gas hydrate dissociation provided by an embodiment of the application.

Step 1-5: the following related parameters of the magnetic resonance imaging are set: the imaging orientation is a sagittal plane (YZ, as shown in FIG. 4(a)), the number of slices is 1, and the slice thickness can cover the whole porous medium, and magnetic resonance imaging is performed on the water-saturated porous medium (as shown in FIG. 4(a)).

The stage of forming the gas hydrate mainly includes the following experimental process.

Step 2-1: a back-pressure value of a back-pressure valve 11 is set as the atmospheric pressure by a hand pump 12, a first valve 7-1 and a second valve 7-2 are opened, and a third valve 7-3 and a fourth valve 7-4 are closed; the gas in a second high-pressure piston container 2-2 is injected into the reaction chamber 4 by controlling a high-pressure pump 1, so that part of the water in the saturated porous can be driven out of the reaction chamber 4. For example, at the beginning of injecting gas into the reaction chamber 4, the porous medium absorbs all injected gas, and after a certain period of time, the porous medium no longer absorbs all injected gas. That is, part of the gas injected into the reaction chamber 4 is discharged from the right end of the reaction chamber (which can also be called beginning of gas production from the porous medium, or beginning of gas production from the right end of the reaction chamber 4). The gas injection is stopped at any one time within a preset time period after beginning of gas production from the right end (i.e., outlet end) of the reaction chamber 4, and the $T_2$ distribution is measured to acquire a total signal intensity $I_1$ of the $T_2$ distribution.

Step 2-2: the second valve 7-2 is closed, and the first valve 7-1, the third valve 7-3 and the fourth valve 7-4 are opened (to prevent the water in the porous medium from being driven out); and the gas in the second high-pressure piston container 2-2 is injected into the reaction chamber 4 by controlling the high-pressure pump 1, so as to increase the pressure in the reaction chamber (i.e., the pore pressure) to the gas hydrate formation pressure $P_1$ (i.e., the pressure required for formation of the gas hydrate).

Step 2-3: the second valve 7-2 are closed, the third valve 7-3 and the fourth valve 7-4 are opened, and the working mode of the high-pressure pump 1 is set as a constant-pressure injection mode; the injection pressure of the high-pressure pump 1 is set, the pressure value of a first pressure sensor 8-1 is kept constant as the gas hydrate formation pressure $P_1$ (i.e., stabilizing the pore pressure in the reaction chamber 4 at the gas hydrate formation pressure $P_1$), the $T_2$ distribution is measured to acquire a total signal intensity of $T_2$ distribution $I_2$, and magnetic resonance imaging is performed.

Step 2-4: the operations of $T_2$ distribution measuring and magnetic resonance imaging are respectively performed at regular intervals until the gas hydrate formation ends.

The total signal intensity $T_2$ distribution measured during the $T_2$ distribution measuring is $I_f$ ($I_f$ is a function changing over time); and the measurement parameters of the magnetic resonance imaging are the same as those used in the step 1-5 in the first stage. Furthermore, the sign of the ending of gas hydrate formation is that the total signal intensity of the $T_2$ distribution almost does not change any more.

The stage of dissociating the gas hydrate and measuring the permeability of the porous medium mainly includes the following experimental process.

Step 3-1: the back-pressure value of the back-pressure valve 11 is set as a certain pressure higher than the gas hydrate formation pressure by the manual pump 12, the first valve 7-1 and the second valve 7-2 are opened, and the third valve 7-3 and the fourth valve 7-4 are closed; the water in the first high-pressure piston container 2-1 is slowly injected into the porous medium by controlling the high-pressure pump 1 to drive out the residual gas in the sample from the reaction chamber 4, and the second valve 7-2 is closed when the outlet end of the reaction chamber 4 does not produce gas any more. The temperature of the injected water is the gas hydrate generation temperature.

Step 3-2: the $T_2$ distribution is measured once at regular intervals until the total signal intensity of the $T_2$ distribution almost does not change any more, and then the operation of magnetic resonance imaging is performed. The measurement parameters of the magnetic resonance image include two imaging orientations: a sagittal plane (YZ) and a cross section (XZ).

The measurement parameters of the sagittal plane (YZ) are the same as those in the step 1-5, and FIG. 4(b) shows the magnetic resonance image on the sagittal plane (YZ). The measurement parameters of the cross section (XZ) are as follows: the number of slices is 4, the slices are the same in thickness, the slices are uniformly distributed and cover the whole sample, and FIG. 4(d) shows the magnetic resonance images of the cross section (XZ).

Step 3-3: the back-pressure value of the back-pressure valve 11 is set as a certain pressure higher than the gas hydrate formation pressure by the manual pump 12, the first valve 7-1 and the second valve 7-2 are opened, and the third valve 7-3 and the fourth valve 7-4 are closed; the water in the first high-pressure piston container 2-1 is injected into the porous medium at a certain injection rate by controlling the high-pressure pump 1, and the pressure difference at the injection rate is recorded when the pressure difference between the first pressure sensor 8-1 and the second pressure sensor 8-2 is stable; the injection rate of the water is adjusted by controlling the high-pressure pump 1, the aforementioned operations are repeated to record the pressure differences at different injection rates, and then the permeability of the porous medium is acquired according to the Darcy's law. The temperature of the injected water is the gas hydrate formation temperature.

Step 3-4: the high-pressure pump 1 is closed, the first valve 7-1, the third valve 7-3 and the fourth valve 7-4 are closed, and the second valve 7-2 is opened; after the back-pressure value of the back-pressure valve 11 is set as a certain pressure lower than the equilibrium pressure of the gas hydrate (which means the lowest pressure at which the gas hydrate can be formed at the experimental temperature) by the manual pump 12, the second valve 7-2 is quickly closed, and at this time, the pore pressure starts to rise due to the dissociation of the gas hydrate in the reaction chamber 4.

Step 3-5: when the pressure value measured by the first pressure sensor 8-1 or the second pressure sensor 8-2 is stable, the dissociation of the gas hydrate stops; the aforementioned steps (3-1) to (3-4) are cyclically performed until the gas hydrate in the porous medium is completely dissociated.

The following is mainly a detailed description of the stage of processing data. The stage of processing data can include two sub-stages of calibrating a magnetic resonance imaging signal and optimizing treatment of the permeability.

FIG. 1 is a flowchart of a correction method for a permeability model provided by an embodiment of the application. As shown in FIG. 1, the correction method can include steps S101-S104.

Before the step S101 is performed, the correction method may further include: determining a relationship model between the signal intensity of the magnetic resonance imaging and water mass of the porous medium in the formation process of the gas hydrate by the steps S1001-

Figure 2:
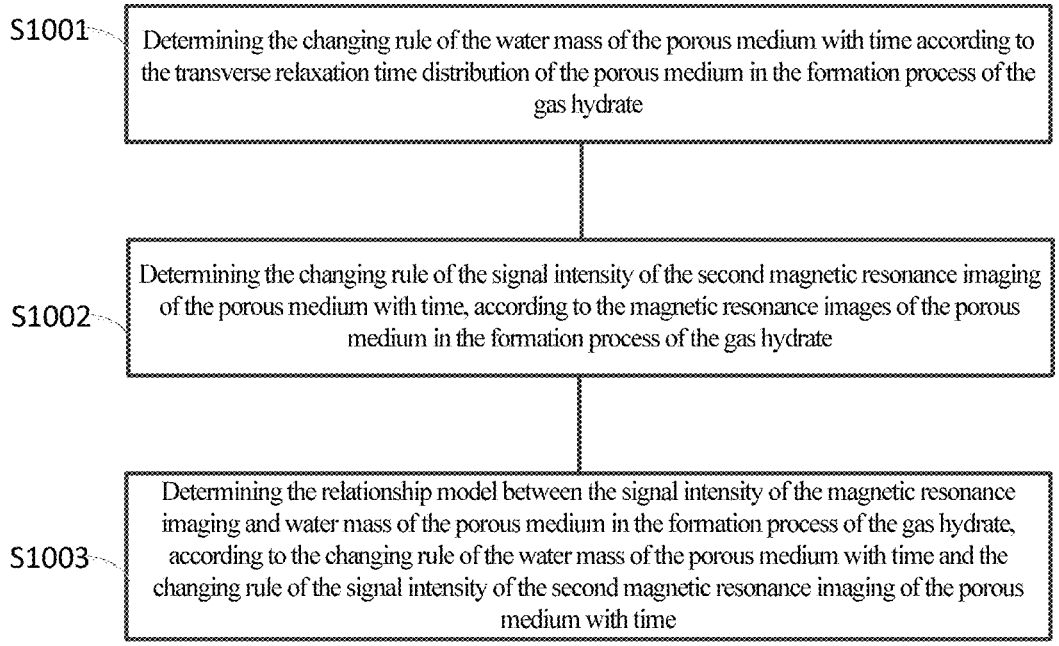
FIG. 2(a) is a flowchart of determining a relationship model between the signal intensity of the magnetic resonance imaging and water mass of the porous medium during the gas hydrate formation provided by an embodiment of the application.
FIG. 2(b) is a flowchart of acquiring the signal intensity of the magnetic resonance imaging of each subregion of the porous medium during the gas hydrate dissociation provided by an embodiment of the application.
Figure 2:
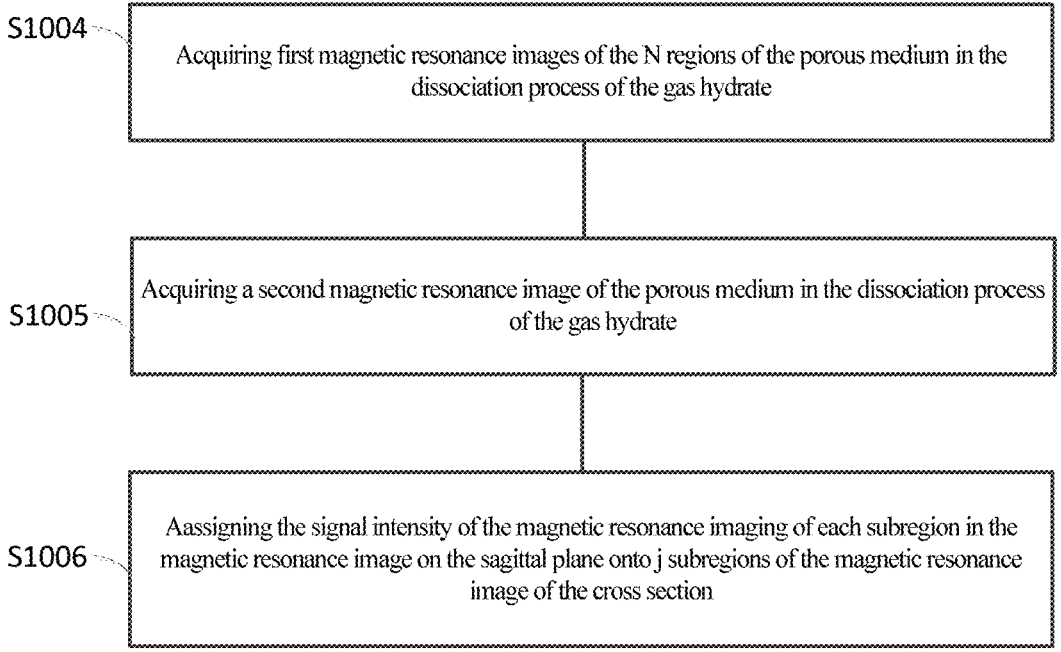

S1003 (i.e., the sub-stage: calibrating the magnetic resonance imaging signal intensity), as shown in FIG. 2(a).

S1001: determining the changing rule of the water mass of the porous medium with time according to the transverse relaxation time distribution of the porous medium in the formation process of the gas hydrate.

Particularly, the step of determining the changing rule of the water mass of the porous medium with time can include the following two cases.

In one case, under the condition that the gas involved in the formation process of the gas hydrate does not contain a protium (H¹) atom, the changing rule of the water mass of the porous medium with time in the formation process of the gas hydrate is determined according to the transverse relaxation time distributions of the porous medium (which are measured at different times under the gas hydrate formation condition in the formation process of the gas hydrate) and the relational expression between the water mass of standard samples and the total signal intensity of transverse relaxation time distribution of the standard samples. That is to say, according to the total signal intensity $I_f$ of the $T_2$ distribution acquired in the step 2-4 in the stage of forming the gas hydrate and the formula (1), it can be determined that the changing rule of the water mass of the porous medium with time is $m_{wf}=aI_f$.

It is found by researches that the total signal intensity of the $T_2$ distribution of the H¹ atom in the gas under a low pressure is very small and is negligible. However, the total signal intensity of the $T_2$ distribution of the H¹ atom in the gas under a high pressure is obviously improved. The influence of the high pressure on the $T_2$ distribution is usually ignored in the existing process of processing the experimental data for acquiring the permeability of the porous medium. However, this embodiment considers the influence of the H¹ atom in the gas under the high pressure on the $T_2$ distribution. In the other case, under the condition that the gas involved in the formation process of the gas hydrate contains the protium (H¹) atom, the changing rule of the water mass of the porous medium with time is determined, according to the transverse relaxation time distribution of the porous medium measured under the atmospheric pressure and the transverse relaxation time distributions of the porous medium measured at different times under the gas hydrate formation pressure (i.e., the high pressure) condition in the formation process of the gas hydrate.

Particularly, under the condition that the gas involved in the formation process of the gas hydrate contains the protium (H¹) atom, the step of determining the changing rule of the water mass of the porous medium with time may include the following.

Firstly, a gas calibration coefficient b is determined according to the relational expression (i.e., formula (1)) between the water mass and the total signal intensity of the transverse relaxation time distribution of the standard samples, the transverse relaxation time distribution of the porous medium measured at any one time in the preset time period when the porous medium starts to produce gas under the atmospheric pressure, the transverse relaxation time distribution of the porous medium measured for the first time under the gas hydrate formation pressure in the formation process of the gas hydrate, and the following formula (2), $$b = \frac{m_{w1} - aI_1}{\rho_w(I_2 - I_1)}, \qquad (2)$$

wherein $m_{w1}$ is the initial saturated water mass of the porous medium (which can be obtained in the step 1-2), a is the water calibration coefficient in the relational expression (which can be obtained in the step 1-3), $\rho_w$ is a density of water, $I_1$ is the total signal intensity of the transverse relaxation time distribution of the porous medium measured at any one time in the preset time period when the porous medium starts to produce gas under the atmospheric pressure (which can be obtained in the step 2-1), and $I_2$ is the total signal intensity of the transverse relaxation time distribution of the porous medium measured for the first time under the gas hydrate formation pressure in the formation process of the gas hydrate (which can be obtained in the step 2-3).

The changing rule of water mass of the porous medium with time is determined according to the water calibration coefficient a, the gas calibration coefficient b, the transverse relaxation time distributions of the porous medium measured at different times under the gas hydrate formation pressure in the formation process of the gas hydrate, and the following formula (3), $$m_{wf} = \left(\frac{124 m_{w1}}{108\rho_h} + bI_f - 1\right) / \left(\frac{124}{108\rho_w} + \frac{b}{\alpha} - \frac{1}{\rho_w}\right), \qquad (3)$$

wherein $m_{wf}$ is the water mass of the porous medium in the formation process of the gas hydrate, $I_f$ is the total signal intensity of the transverse relaxation time distribution of the porous medium measured at different times under the gas hydrate formation pressure in the formation process of the gas hydrate (which can be obtained in the step 2-4), and $\rho_h$ is the density of the gas hydrate.

Step S1002: determining the changing rule of the signal intensity of the second magnetic resonance imaging of the porous medium with time, according to the magnetic resonance images of the porous medium in the formation process of the gas hydrate.

The imaging orientation of the second magnetic resonance imaging is a sagittal plane, and the second magnetic resonance imaging of the porous medium in the formation process of the gas hydrate is obtained through the aforementioned step 2-4.

Step S1003: determining the relationship model between the signal intensity of the magnetic resonance imaging and water mass of the porous medium in the formation process of the gas hydrate, according to the changing rule of the water mass of the porous medium with time and the changing rule of the signal intensity of the second magnetic resonance imaging of the porous medium with time.

Figure 6:
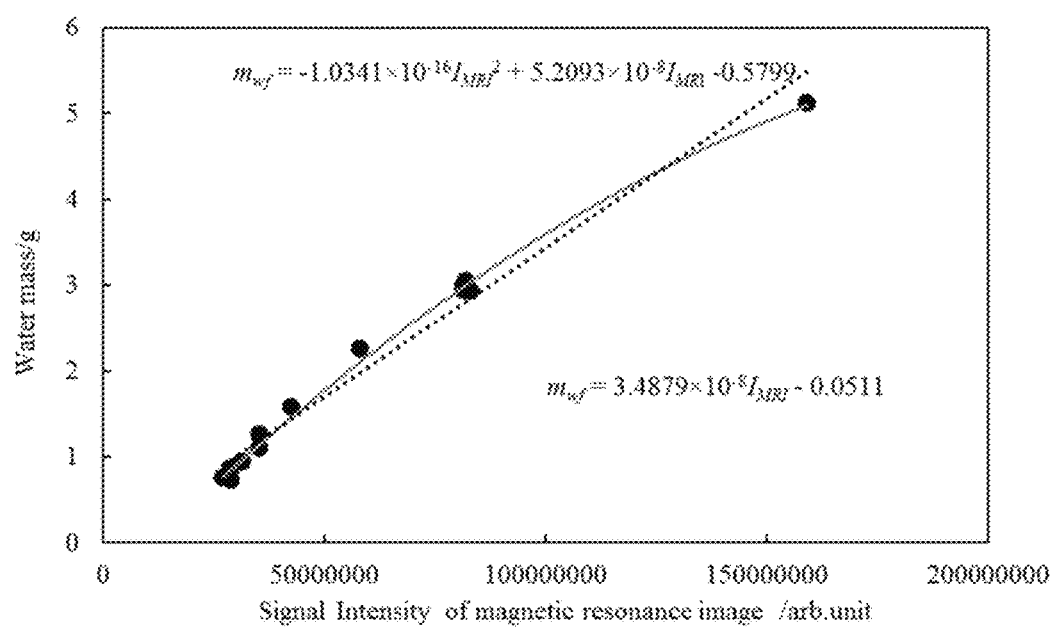
FIG. 6 is a schematic diagram of relationship models of a linear type and a conic type provided by an embodiment of the application.

The relational model may be of a linear type (as shown by the dotted line in FIG. 6) or a conic type (as shown by the solid line in FIG. 6).

Since only the magnetic resonance images of the porous medium can be extracted (the influence of bulk water in the reaction chamber 4 can be removed), the signal intensity of the magnetic resonance imaging of the aforementioned porous medium only comes from the signal of water in the porous medium. In contrast, the influence of bulk water in the reaction chamber 4 cannot be removed in the T2 distribution, so that the water mass of each subregion of the porous medium obtained based on the relational model is more accurate.

Before the step S101 is performed, the signal intensity of the magnetic resonance imaging of each subregion of the porous medium in the dissociation process of the gas hydrate can also be acquired by the following steps S1004-S1006 (i.e., the sub-stage: optimizing treatment of the permeability), as shown in FIG. 2(b). The porous medium is theoretically divided into i regions along the transverse direction (the direction as shown by the X axis in FIG. 4(e)) of the cross section of the porous medium, j regions along the longitudinal direction (the direction as shown by the Y axis in FIG. 4(e)) of the cross section, and N regions along the axial direction (the direction as shown by the Z axis in FIG. 4(e)) of the porous medium.

Step S1004: acquiring first magnetic resonance images of the N regions of the porous medium in the dissociation process of the gas hydrate.

The imaging orientations of the first magnetic resonance images are the cross section (XZ) of the porous medium, and the first magnetic resonance image of each of the N regions is divided into i*j subregions, which is equivalent to the porous medium being divided into N*i*j subregions. As shown in FIG. 4(e), the magnetic resonance images XZ-11, XZ-12, XZ-13 and XZ-14 (as shown in FIG. 4(d)) of the cross-section (XZ) imaging orientations of four regions A, B, C and D are respectively acquired, and then each magnetic resonance image is divided into 5*5 subregions. That is, the porous medium is divided into 4*5*5 subregions.

Step S1005: acquiring a second magnetic resonance image of the porous medium in the dissociation process of the gas hydrate.

The imaging orientation of the second magnetic resonance image is the sagittal plane (YZ), and the second magnetic resonance image is divided into N regions, each of which has i subregions. As shown in FIG. 4(e), the magnetic resonance image on the sagittal plane (YZ) imaging orientation is divided into four regions (A, B, C and D regions), and each region has 5 subregions (as shown in FIG. 4(b)). The imaging parameters of the second magnetic resonance imaging are the same as those used in the second magnetic resonance imaging (i.e., the magnetic resonance imaging in the step S1002) involved in the formation process of the gas hydrate.

In the step S1003, the quantitative relationship model between the signal intensity of the magnetic resonance imaging (on the sagittal plane imaging orientation, referred to as the sagittal plane for short) and water mass of the porous medium is determined. Since the imaging parameters on the sagittal plane and the cross section imaging orientation (referred to as the cross section for short) are different, it is impossible to directly calculate the water mass by using the signal intensity of the magnetic resonance imaging of the cross section, so that the signal intensity of the magnetic resonance imaging of each subregion on the cross section imaging orientation can be reset based on the magnetic resonance image on the sagittal plane. Please see step S1006 for details.

Step S1006: assigning the signal intensity of the magnetic resonance imaging of each subregion in the magnetic resonance image on the sagittal plane onto j subregions of the magnetic resonance image of the cross section (the j subregions are corresponding to each subregion in the magnetic resonance image on the sagittal plane), according to the ratio of magnetic resonance imaging signal intensities of the j subregions of the magnetic resonance image of the cross section, so as to acquire the signal intensity of the magnetic resonance imaging of each subregion of the porous medium in the dissociation process of the gas hydrate.

Particularly, for the subregion g in the magnetic resonance image on the sagittal plane (YZ) shown in FIG. 4(b), according to the ratio of the magnetic resonance imaging signal intensities of 5 subregions of a region G (as shown in FIG. 4(d)) in the magnetic resonance image (XZ-11) of the cross section (XZ) corresponding to the subregion g, the signal intensity of the magnetic resonance imaging of the subregion g is reassigned onto the five subregions of the region G. For other subregions in the magnetic resonance image on the sagittal plane (YZ), the aforementioned steps are similarly performed to assign the signal intensity of the magnetic resonance imaging on the sagittal plane (YZ) onto the corresponding cross section. The sum of the updated magnetic resonance imaging signal intensities of 100 subregions of the cross section (XZ) is the same as the signal intensity of the magnetic resonance imaging of the corresponding sagittal plane (YZ).

By the aforementioned steps S1001-S1006, the relationship model between the signal intensity of the magnetic resonance imaging and water mass of the porous medium in the formation process of the gas hydrate and the signal intensity of the magnetic resonance imaging of each subregion of the porous medium in the dissociation process of the gas hydrate can be obtained. However, for the performing sequence of the steps S1001-S1003 and the steps S1004-S1006, the steps S1001-S1003 may be performed first, or the steps S1004-S1006 may be performed first.

Step S101: calculating the water mass of each subregion of a porous medium in a dissociation process of a gas hydrate according to a relationship model between the signal intensity of the magnetic resonance imaging and water mass of the porous medium in a formation process of the gas hydrate and the signal intensity of the magnetic resonance imaging of each subregion of the porous medium in the dissociation process of the gas hydrate.

The water mass of each subregion of the porous medium changes with time in the dissociation process of the gas hydrate.

Particularly, based on the reset signal intensity of the magnetic resonance imaging of each subregion of the porous medium in the dissociation process of the gas hydrate and the relational model, the water mass of each subregion of the porous medium in the dissociation process of the gas hydrate can be calculated.

Step S102: calculating the hydrate saturation of each subregion of the porous medium in the dissociation process of the gas hydrate, according to the water mass of each subregion of the porous medium in the dissociation processes of the gas hydrate and the initial saturated water mass of each subregion of the porous medium.

For the step S102, the step of calculating the hydrate saturation of each subregion of the porous medium in the dissociation process of the gas hydrate can include: calculating the hydrate saturation of each subregion of the porous medium in the dissociation process of the gas hydrate according to the following formula (4), $$S_{hi} = 1 - \frac{m_{wi}}{m_{w0i}}, \quad (4)$$

wherein $S_{hi}$ is the hydrate saturation of the ith subregion in the dissociation processes of the gas hydrate, $m_{wi}$ is the water mass of the ith subregion in the dissociation processes of the gas hydrate, and $m_{w0i}$ is the initial saturated water mass of the ith subregion (which can be acquired from the magnetic resonance image on the sagittal plane in the step 1-5 (as shown in FIG. 4(a))). For $m_{w0i}$, the porous medium can be assumed to be a homogeneous sample, that is, the initial saturated water mass of each subregion of the porous medium is the same.

Step S103: calculating the average permeability of the porous medium in the dissociation process of the gas hydrate, according to the hydrate saturation of each subregion of the porous medium in the dissociation process of the gas hydrate and the permeability model.

The value of the permeability characteristic parameter in the permeability model is the initial value of the permeability characteristic parameter.

The permeability model and the range of the initial value can be selected by reference to published technical data or self-established. In this embodiment, the following formula (5) can be taken as the permeability model:

$$k(S_h) = k_0 \cdot k_r = k_0 \cdot f(S_h, c) \quad (5)$$

wherein $k_r$ is the relative permeability of the porous medium, $S_h$ is the hydrate saturation of the porous medium, $k(S_h)$ is the permeability of the porous medium when the hydrate saturation is $S_h$, $k_0$ is the initial permeability of the porous medium (i.e. the permeability of the hydrate-free porous medium), and c is the permeability characteristic parameter (which characterizes the permeability change of the porous medium). In this embodiment, the initial permeability and initial porosity of each subregion of the porous medium are the same, that is, the initial permeability of each subregion is equal to the initial permeability of the porous medium. Furthermore, during the process of measuring the permeability, the residual gas content in the porous medium is negligible, that is, only liquid and the gas hydrate exist in the pores of the porous medium. Here, the specific process of measuring the permeability of the porous medium will not be described in detail anymore, and various existing technical data can be referred.

Figure 7:
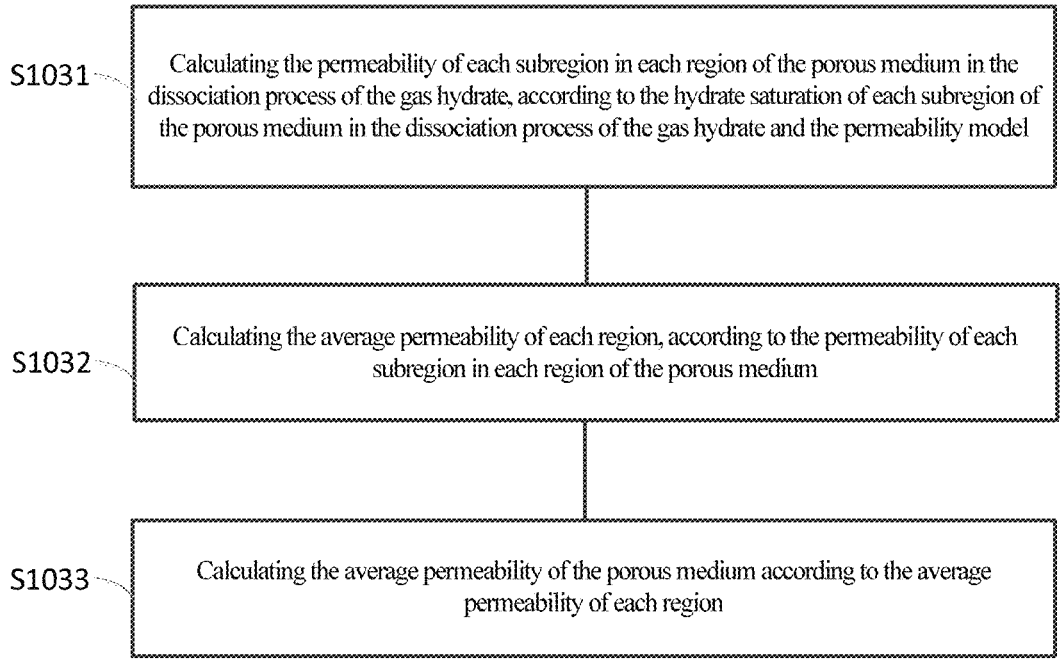
FIG. 7 is a flowchart of calculating the average permeability of the porous medium during the gas hydrate dissociation provided by an embodiment of the application.

With respect to the step S103, the step of calculating the average permeability of the porous medium in the dissociation process of the gas hydrate may include steps S1031-S1033, as shown in FIG. 7.

Step S1031: calculating the permeability of each subregion in each region of the porous medium in the dissociation process of the gas hydrate, according to the hydrate saturation of each subregion of the porous medium in the dissociation process of the gas hydrate and the permeability model.

The value range and initial value $c_0$ of the permeability characteristic parameter in the permeability model (e.g., the permeability model as shown in the formula (5)) can be determined.

Under the condition that the initial value $c_0$ of the permeability characteristic parameter is determined, the permeability model is determined, so that based on the hydrate saturation $S_{hnst}$ of each subregion of the porous medium in the dissociation process of the gas hydrate and the formula (5), and thus the permeability $k_{nst}$ of each subregion of the porous medium in the dissociation process of the gas hydrate can be calculated.

Step S1032: calculating the average permeability of each region, according to the permeability of each subregion in each region of the porous medium.

Particularly, the step of calculating the average permeability of each region can include: calculating the average permeability $\bar{k}_n$ of any region n of the N regions according to the following formula (6), $$\bar{k}_n = \frac{\sum_{t=1}^{t=j}\sum_{s=1}^{s=i} k_{nst} A_{nst}}{\sum_{t=1}^{t=j}\sum_{s=1}^{s=i} A_{nst}}, \quad (6)$$

wherein $k_{nst}$ is the permeability of the subregion at row s and column t on the region n, $A_{nst}$ is the area of the subregion at row s and column t on the region n, i is the number of rows of subregions on the cross section of each region (the number of rows is 5 as shown in FIG. 4(d)), and j is the number of columns of subregions on the cross section of each region (the number of columns is 5 as shown in FIG. 4(d)).

Step S1033: calculating the average permeability of the porous medium according to the average permeability of each region.

Figure 5:
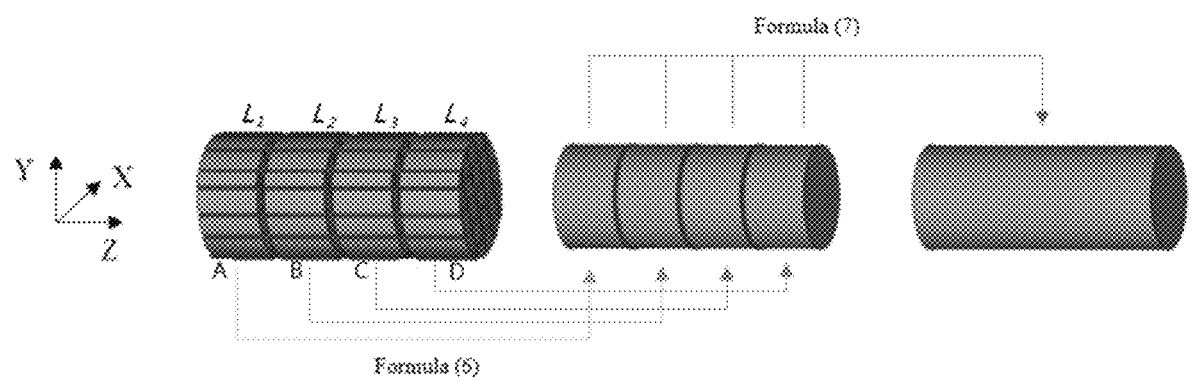
FIG. 5 is a schematic diagram of calculating the average permeability of the porous medium during the gas hydrate dissociation provided by an embodiment of the application.

Particularly, the step of calculating the average permeability of the porous medium includes: calculating the average permeability $\bar{k}$ of the porous medium according to the following formula (7), $$\bar{k} = \frac{L}{\sum_{n=1}^{N} \frac{L_n}{k_n}} \quad (7)$$

wherein $L_n$ is the longitudinal length of the porous medium in the region n (as shown in FIG. 5, the longitudinal length of the porous medium in the region 1 is $L_1$, and the longitudinal length of the porous medium in the region 2 is $L_2$ . . . ), L is the longitudinal length of the porous medium, and N is the number of the acquired magnetic resonance images of the cross section (XZ) (N is 4, as shown in FIG. 4(d)).

Step S104: determining the initial value of the permeability characteristic parameter as an optimal value of the permeability characteristic parameter, under the condition that the difference between the average permeability of the porous medium and the actually measured permeability in the dissociation process of the gas hydrate is less than or equal to a preset value.

The deviation of the calculated average permeability $\bar{k}$ in the dissociation process of the gas hydrate from the actually measured permeability is compared. If the deviation is less than or equal to a preset value (e.g., the acceptable maximum deviation), the initial value $c_0$ of the permeability characteristic parameter is the optimal value, thereby obtaining the corrected permeability model. If the deviation is larger than the preset value, the value of the permeability characteristic parameter c is adjusted according to the value range of the permeability characteristic parameter c, and the step S103 is cyclically performed. Please see the following description for details.

The correction method may further include: correcting the value of the permeability characteristic parameter to acquire a corrected permeability model, under the condition that the difference between the average permeability of the porous medium in the dissociation process of the gas hydrate and the actually measured permeability is larger than the preset value; calculating the average permeability of the porous medium in the dissociation process of the gas hydrate, according to the hydrate saturation of each subregion of the porous medium in the dissociation process of the gas hydrate and the corrected permeability model; and determining the corrected value of the permeability characteristic parameter as the optimal value of the permeability characteristic parameter, under the condition that the difference between the average permeability of the porous medium in the dissociation process of the gas hydrate and the actually measured permeability is less than or equal to the preset value. The specific steps as performed can be referred to the description of the aforementioned steps S1031-S1033, and will not be described in detail here.

In view of the above, in the application, the correction method first calculates the water mass of each subregion of the porous medium in the dissociation process of the gas hydrate, then calculates the hydrate saturation of each subregion of the porous medium in the dissociation process of the gas hydrate, then calculates the average permeability of the porous medium in the dissociation process of the gas hydrate according to the hydrate saturation of each subregion of the porous medium in the dissociation process of the gas hydrate and the permeability model, and finally determines the initial value of the permeability characteristic parameter as the optimal value of the permeability characteristic parameter when the difference between the average permeability of the porous medium and the actually measured permeability in the dissociation process of the gas hydrate is less than or equal to a preset value. That is to say, the correction method corrects the permeability model by considering the influence of the heterogeneous distribution of the gas hydrate in the porous medium on the permeability model, so that the permeability characteristics of the porous medium can be accurately measured by the corrected permeability model, and the practicability of the correction method is strong.

Figure 8:
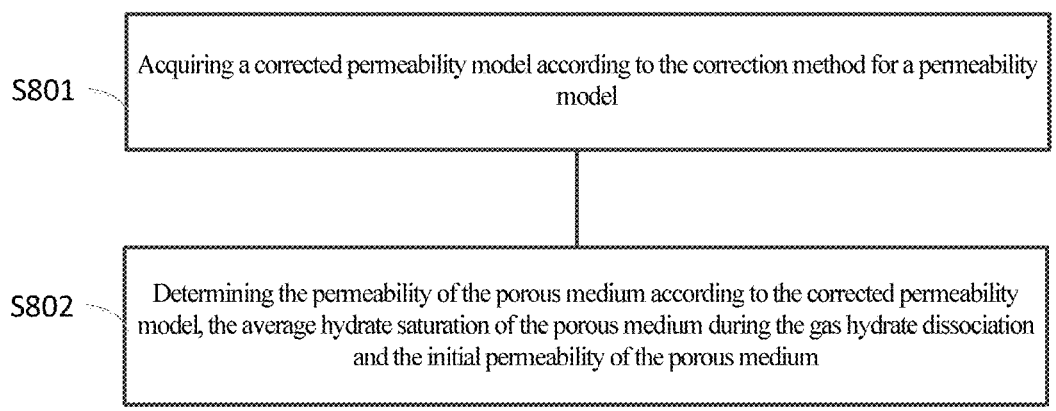
FIG. 8 is a flowchart of a method for determining the permeability of a porous medium provided by an embodiment of the application.

FIG. 8 is a flowchart of a method for determining the permeability of the porous medium provided by an embodiment of the application. As shown in FIG. 8, the method can include: a step S801 of acquiring a corrected permeability model according to the correction method for a permeability model; and a step S802 of determining the permeability of the porous medium according to the corrected permeability model, the average hydrate saturation of the porous medium during the gas hydrate dissociation and the initial permeability of the porous medium.

If the corrected permeability model obtained by the aforementioned process is k ($S_h$)=$k_0$f ($S_h$, c'), wherein c' is the optimal value of the permeability characteristic parameter (i.e., the corrected permeability characteristic parameter), the permeability k=$k_0$f($\overline{S_h}$, c') of the porous medium can be obtained, based on the average hydrate saturation $\overline{S_h}$ of the porous medium in the dissociation process of the gas hydrate, the initial permeability $k_0$ of the porous medium and the corrected permeability model. The process of acquiring the measured values of $\overline{S_h}$ and $k_0$ can refer to the statement in the data of the prior art, and will not be repeated here.

Through the aforementioned technical solution, in the application, the method for determining the permeability of the porous medium creatively acquires the corrected permeability model through the correction method for a permeability model, and then determines the permeability of the porous medium based on the corrected permeability model and the hydrate saturation of the porous medium in the dissociation process of the gas hydrate, so that the permeability characteristics of the porous medium can be accurately measured by the corrected permeability model, and the practicability of the method is strong.

Figure 9:
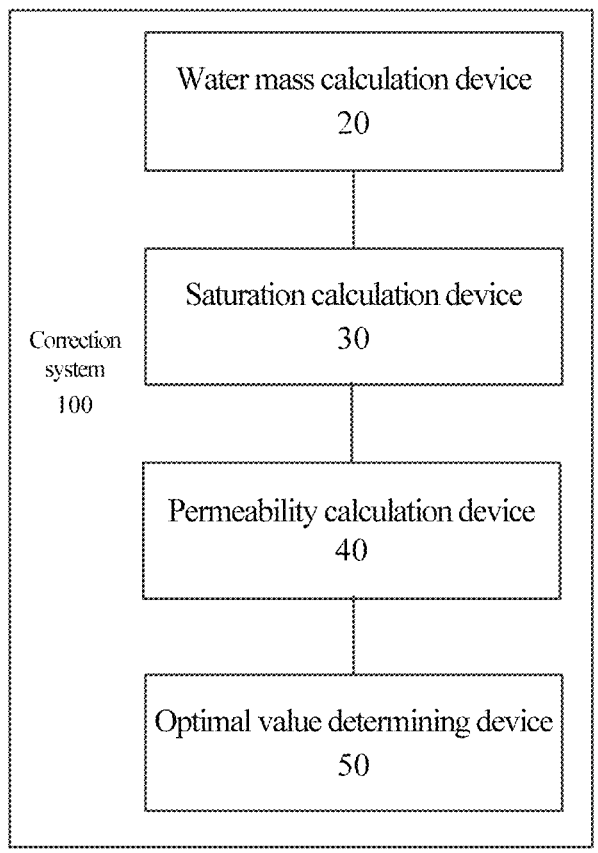
FIG. 9 is a structural diagram of a correction system for a permeability model provided by an embodiment of the application.

FIG. 9 is a structural diagram of a correction system for a permeability model provided by an embodiment of the application. As shown in FIG. 9, the correction system 100 can include: a water mass calculation device 20, configured to calculate the water mass of each subregion of a porous medium in a dissociation process of a gas hydrate, according to a relationship model between the signal intensity of the magnetic resonance imaging and water mass of the porous medium in a formation process of the gas hydrate and the signal intensity of the magnetic resonance imaging of each subregion of the porous medium in the dissociation process of the gas hydrate; a saturation calculation device 30, configured to calculate the hydrate saturation of each subregion of the porous medium in the dissociation process of the gas hydrate, according to the water mass of each subregion of the porous medium in the dissociation processes of the gas hydrate and the initial saturated water mass of each subregion of the porous medium; a permeability calculation device 40, configured to calculate the average permeability of the porous medium in the dissociation process of the gas hydrate, according to the hydrate saturation of each subregion of the porous medium in the dissociation process of the gas hydrate and the permeability model, wherein the value of a permeability characteristic parameter in the permeability model is an initial value of the permeability characteristic parameter; and an optimal value determining device 50, configured to determine the initial value of the permeability characteristic parameter as an optimal value of the permeability characteristic parameter, under the condition that the difference between the average permeability of the porous medium and the actually measured permeability in the dissociation process of the gas hydrate is less than or equal to a preset value.

Preferably, the correction system further includes a correction device (not shown), configured to correct the value of the permeability characteristic parameter to acquire a corrected permeability model, under the condition that the difference between the average permeability of the porous medium and the actually measured permeability in the dissociation process of the gas hydrate is larger than the preset value. Correspondingly, the permeability calculation device 40 is further configured to calculate the average permeability of the porous medium in the dissociation process of the gas hydrate, according to the gas hydrate saturation of each subregion of the porous medium in the dissociation process of the gas hydrate and the corrected permeability model; and the optimal value determining device 50 is further configured to determine the corrected value of the permeability characteristic parameter as the optimal value of the permeability characteristic parameter, under the condition that the difference between the average permeability of the porous medium and the actually measured permeability in the dissociation process of the gas hydrate is less than or equal to the preset value.

Preferably, the correction system further includes: a signal acquisition device (not shown), configured to acquire the signal intensity of the magnetic resonance imaging of each subregion of the porous medium in the dissociation process of the gas hydrate in the following manner, wherein the porous medium is theoretically divided into i regions along the transverse direction of its cross section, j regions along the longitudinal direction of its cross section, and N regions along its axial direction. The signal acquisition device further includes: a first image acquisition module, configured to acquire first magnetic resonance images of the N regions of the porous medium in the dissociation process of the gas hydrate, wherein the imaging orientations of the first magnetic resonance images are the cross section of the porous medium, and the first magnetic resonance image of each of the N regions are divided into i*j subregions; a second image acquisition module, configured to acquire a second magnetic resonance image of the porous medium in the dissociation process of the gas hydrate, wherein the imaging orientation of the second magnetic resonance image is a sagittal plane, and the second magnetic resonance image is divided into N regions, each of which has i subregions, and the imaging parameters of the second magnetic resonance image are the same as those used in the second magnetic resonance image involved in the formation process of the gas hydrate; and an assignment module, configured to assign the signal intensity of the magnetic resonance imaging of each subregion in the second magnetic resonance image onto the j subregions of the first magnetic resonance image, wherein j subregions of the first magnetic resonance image are corresponding to each subregion in the N regions of the second magnetic resonance image, according to the ratio of magnetic resonance imaging signal intensities of the j subregions, so as to acquire the signal intensity of the magnetic resonance imaging of each subregion of the porous medium in the dissociation process of the gas hydrate.

Preferably, the permeability calculation device 40 includes a first permeability calculation module, configured to calculate the permeability of each subregion in each region of the porous medium in the dissociation process of the gas hydrate, according to the hydrate saturation of each subregion of the porous medium during the gas hydrate dissociation and the permeability model; a second permeability calculation module, configured to calculate the average permeability of each region, according to the permeability of each subregion in each region of the porous medium; and a third permeability calculation module, configured to calculate the average permeability of the porous medium, according to the average permeability of each region.

Preferably, the correction system further includes: a first changing rule determination device (not shown), configured to determine the changing rule of the water mass of the porous medium with time, according to the transverse relaxation time distribution of the porous medium in the formation process of the gas hydrate; a second changing rule determination device (not shown), configured to determine the changing rule of the signal intensity of the second magnetic resonance imaging of the porous medium with time, according to the magnetic resonance images of the porous medium in the formation process of the gas hydrate, wherein the imaging orientation of the second magnetic resonance imaging is a sagittal plane; and a model determining device (not shown), configured to determine the relationship model between the signal intensity of the magnetic resonance imaging and water mass of the porous medium in the formation process of the gas hydrate, according to the changing rule of the water mass of the porous medium with time and the changing rule of the signal intensity of the second magnetic resonance imaging of the porous medium with time.

Details and advantages of the correction system for a permeability model can be found in the description of the aforementioned correction method for a permeability model, and will not be repeated here.

Figure 10:
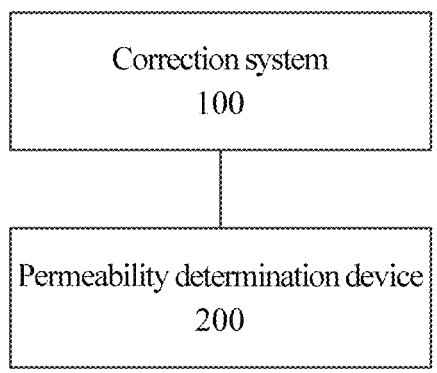
FIG. 10 is a structural diagram of a system for determining the permeability of a porous medium provided by an embodiment of the application.

FIG. 10 is a structural diagram of a system for determining the permeability of a porous medium provided by an embodiment of the application. As shown in FIG. 10, the system can include: the permeability model correction system 100, configured to acquire a corrected permeability model; and a permeability determination device 200, configured to determine the permeability of the porous medium, according to the corrected permeability model, the average hydrate saturation of the porous medium in the dissociation process of the gas hydrate and the initial permeability of the porous medium.

Details and advantages of the system for determining the permeability of a porous medium can be found in the description of the aforementioned method for determining the permeability of a porous medium, and they will not be repeated here.

Another embodiment of the application provides a machine-readable storage medium, storing an instruction which is used to enable a machine to execute the correction method for a permeability model and/or the method for determining the permeability of a porous medium.

The machine-readable storage medium comprises, but not limited to, phase change memory (Phase Change Random Access Memory, PRAM, also known as RCM/PCRAM), static random access memory (SRAM), dynamic Random access memory (DRAM), other types of a random access memory (RAM), a read-only memory (ROM), an electrically erasable programmable read-only memory (EEPROM), a flash memory or other memory Technology, a Compact Disk Read Only Memory (CD-ROM), a digital versatile disk (DVD) or other optical storage, magnetic cassette tape, magnetic tape disk storage or other magnetic storage devices and other various media that can store program codes.

Preferred embodiments of the present invention are described in detail above in combination with accompanying drawings, however, but the present invention is not limited to specific details in the embodiments, various simple variations for the technical solution of the present invention may be realized within the scope of technical concept of the present invention, and the simple variations fall into the scope of the present invention.

In addition, it should be noted that specific technical characteristics described in the detailed embodiments may be combined in any proper ways under the condition that no conflicts are generated. Various possible combination ways are not described separately again in order to avoid unnecessary repetition.

In addition, various different embodiments of the present invention may be arbitrarily combined and should also be regarded as contents disclosed by the present invention as long as the thought of the present invention is obeyed.

The invention claimed is:

1. A method for determining a permeability of a porous medium in a laboratory, comprising:
   forming a gas hydrate in the porous medium in a reaction chamber;
   dissociating the gas hydrate;
   conducting, by a low-field magnetic resonance analyzer, magnetic resonance imaging of each subregion of the porous medium in the dissociation process of the gas hydrate;
   calculating a water mass of each subregion of the porous medium in the dissociation process of the gas hydrate, according to a relationship model between a signal intensity of a magnetic resonance imaging and a water mass of the porous medium in the formation process of the gas hydrate and the signal intensity of the magnetic resonance imaging of each subregion of the porous medium in the dissociation process of the gas hydrate;
   calculating a hydrate saturation of each subregion of the porous medium in the dissociation process of the gas hydrate, according to the water mass of each subregion of the porous medium in the dissociation processes of the gas hydrate and the initial saturated water mass of each subregion of the porous medium;
calculating an average permeability of the porous medium in the dissociation process of the gas hydrate, according to the hydrate saturation of each subregion of the porous medium in the dissociation process of the gas hydrate and a permeability model, wherein a value of a permeability characteristic parameter in the permeability model is an initial value of the permeability characteristic parameter;
determining the initial value of the permeability characteristic parameter as an optimal value of the permeability characteristic parameter, under a condition that a difference between the average permeability of the porous medium and an actually measured permeability in the dissociation process of the gas hydrate is less than or equal to a preset value; and
determining the permeability of the porous medium, according to the permeability model, an average hydrate saturation of the porous medium in the dissociation process of the gas hydrate, and an initial permeability of the porous medium,
wherein the step of calculating the hydrate saturation of each subregion of the porous medium in the dissociation process of the gas hydrate comprises:
calculating the hydrate saturation of each subregion of the porous medium in the dissociation process of the gas hydrate according to the following formula, $$S_{hi} = 1 - \frac{m_{wi}}{m_{w0i}},$$

wherein $S_{hi}$ is a hydrate saturation of a ith subregion in the dissociation processes of the gas hydrate, $m_{wi}$ is a water mass of the ith subregion in the dissociation processes of the gas hydrate, and $m_{w0i}$ is an initial saturated water mass of the ith subregion.

2. The method for determining a permeability of a porous medium in a laboratory according to claim 1, wherein after the step of calculating an average permeability of the porous medium in the dissociation process of the gas hydrate, the correction method further comprises:
correcting the value of the permeability characteristic parameter to obtain a corrected permeability model, under a condition that the difference between the average permeability of the porous medium and the actually measured permeability in the dissociation process of the gas hydrate is larger than the preset value;
calculating the average permeability of the porous medium in the dissociation process of the gas hydrate, according to the hydrate saturation of each subregion of the porous medium in the dissociation process of the gas hydrate and the corrected permeability model; and
determining the corrected value of the permeability characteristic parameter as the optimal value of the permeability characteristic parameter, under the condition that the difference between the average permeability of the porous medium and the actually measured permeability in the dissociation process of the gas hydrate is less than or equal to the preset value.

3. The method for determining a permeability of a porous medium in a laboratory according to claim 1, wherein the signal intensity of the magnetic resonance imaging of each subregion of the porous medium in the dissociation process of the gas hydrate is obtained by the following manner, wherein the porous medium is theoretically divided into i regions along the transverse direction of its cross section, j regions along the longitudinal direction of its cross section, and N regions along its axial direction:
acquiring first magnetic resonance images of the N regions of the porous medium in the dissociation process of the gas hydrate, wherein imaging orientations of the first magnetic resonance images are the cross section of the porous medium, and the first magnetic resonance image of each of the N regions is divided into i*j subregions;
acquiring a second magnetic resonance image of the porous medium in the dissociation process of the gas hydrate, wherein an imaging orientation of the second magnetic resonance image is a sagittal plane, the second magnetic resonance image is divided into N regions, wherein each region has i subregions; and
assigning the signal intensity of the magnetic resonance imaging of each subregion in the second magnetic resonance imaging onto j subregions of the first magnetic resonance image, wherein j subregions of the first magnetic resonance image are corresponding to each subregion in the N regions of the second magnetic resonance image, according to a ratio of magnetic resonance imaging signal intensities of the j subregions, so as to acquire the signal intensity of the magnetic resonance imaging of each subregion of the porous medium in the dissociation process of the gas hydrate.

4. The method for determining a permeability of a porous medium in a laboratory according to claim 3, wherein the step of calculating the average permeability of the porous medium in the dissociation process of the gas hydrate comprises:
calculating the permeability of each subregion in each region of the porous medium in the dissociation process of the gas hydrate, according to the hydrate saturation of each subregion of the porous medium in the dissociation process of the gas hydrate and the permeability model;
calculating the average permeability of each region, according to the permeability of each subregion in each region of the porous medium; and
calculating the average permeability of the porous medium, according to the average permeability of each region.

5. The method for determining a permeability of a porous medium in a laboratory according to claim 4, wherein
the step of calculating the average permeability of each region comprises: calculating the average permeability $\overline{k}_n$ of any one region n of the N regions according to the following formula, $$\overline{k}_n = \frac{\sum_{t=1}^{t=j}\sum_{s=1}^{s=i} k_{nst} A_{nst}}{\sum_{t=1}^{t=j}\sum_{s=1}^{s=i} A_{nst}},$$

wherein $k_{nst}$ is the permeability of the subregion at row s and column t on the cross section of the region n, and $A_{nst}$ is an area of the subregion at row s and column t on the cross section of the region n; and/or
the step of calculating the average permeability of the porous medium comprises: calculating the average permeability $\overline{k}$ of the porous medium according to the following formula, $$\bar{k} = \frac{L}{\sum_{n=1}^{N} \frac{L_n}{k_n}}$$

wherein $L_n$ is the longitudinal length of the porous medium in the region n, and L is the longitudinal length of the porous medium.

6. The method for determining a permeability of a porous medium in a laboratory according to claim 3, wherein before the step of calculating the water mass of each subregion of the porous medium in the dissociation process of the gas hydrate is performed, the correction method further comprises:
  determining a changing rule of the water mass of the porous medium with time according to transverse relaxation time distributions of the porous medium in the formation process of the gas hydrate;
  determining a changing rule of the signal intensity of the second magnetic resonance imaging of the porous medium with time, according to the magnetic resonance images of the porous medium in the formation process of the gas hydrate, wherein an imaging orientation of the second magnetic resonance imaging is a sagittal plane, and imaging parameters of the second magnetic resonance imaging are the same as those used in the second magnetic resonance image of the porous medium in the dissociation process of the gas hydrate; and
  determining the relationship model between the signal intensity of the second magnetic resonance imaging and the water mass of the porous medium in the formation process of the gas hydrate, according to the changing rule of the water mass of the porous medium with time and the changing rule of the signal intensity of the second magnetic resonance imaging of the porous medium with time.

7. The method for determining a permeability of a porous medium in a laboratory according to claim 6, wherein the step of determining the changing rule of the water mass of the porous medium with time comprises:
  providing standard samples in the reaction chamber, wherein the standard samples are standard porous medium samples containing water;
  determining the changing rule of the water mass of the porous medium with time in the formation process of the gas hydrate, according to the transverse relaxation time distributions of the porous medium measured at different times under the gas hydrate formation pressure in the formation process of the gas hydrate and a relational expression between a water mass of the standard samples and a total signal intensity of transverse relaxation time distribution of the standard samples, under a condition that the gas involved in the formation process of the gas hydrate does not contain a protium atom; or
  determining the changing rule of the water mass of the porous medium with time, according to the relational expression between the water mass of the standard samples and the total signal intensity of transverse relaxation time distribution of the standard samples, the transverse relaxation time distribution of the porous medium measured at one time in a preset time period when the porous medium starts to produce gas under an atmospheric pressure, and the transverse relaxation time distribution of the porous medium measured at different times under the gas hydrate formation pressure in the formation process of the gas hydrate, under a condition that the gas involved in the formation process of the gas hydrate contains the protium atom.

8. The method for determining a permeability of a porous medium in a laboratory according to claim 7, wherein the step of determining the changing rule of the water mass of the porous medium with time under the condition that the gas involved in the formation process of the gas hydrate contains the protium atom comprises: determining a gas calibration coefficient b, according to the relational expression between the water mass of standard samples and the total signal intensity of transverse relaxation time distribution of the standard samples, the transverse relaxation time distribution of the porous medium measured at any one time in the preset time period when the porous medium starts to produce gas under the atmospheric pressure, the transverse relaxation time distribution of the porous medium measured for the first time under a gas hydrate formation pressure in the formation process of the gas hydrate and the following formula, $$b = mw1 - aI1\rho w(I2 - I1)b = \frac{m_{w1} - aI_1}{\rho_w(I_2 - I_1)},$$

wherein $m_{w1}$ is an initial saturated water mass of the porous medium, a is a water calibration coefficient in the relational expression, $\rho_w$ is a density of water, $I_1$ is a total signal intensity of the transverse relaxation time distribution of the porous medium measured at any one time in the preset time period when the porous medium starts to produce gas under the atmospheric pressure, and $I_2$ is a total signal intensity of the transverse relaxation time distribution of the porous medium measured for the first time under the gas hydrate formation pressure in the formation process of the gas hydrate; and
  determining the changing rule of water mass of the porous medium with time, according to the water calibration coefficient, the gas calibration coefficient, the transverse relaxation time distributions of the porous medium measured at different times under the gas hydrate formation pressure in the formation process of the gas hydrate and the following formula, $$m_{wf} = \left(\frac{124 m_{w1}}{108\rho_h} + bI_f - 1\right) \Big/ \left(\frac{124}{108\rho_w} + \frac{b}{\alpha} - \frac{1}{\rho_w}\right),$$

wherein $m_{wf}$ is the water mass of the porous medium in the formation process of the gas hydrate, $I_f$ is the total signal intensity of the transverse relaxation time distributions of the porous medium measured at different times under the gas hydrate formation pressure in the formation process of the gas hydrate, and $\rho_h$ is a density of the gas hydrate.

9. A system for determining the permeability of a porous medium in a laboratory, comprising:
  a reaction chamber, configured to contain the porous medium;
  a high-pressure piston container, configured to inject gas into the reaction chamber to form a gas hydrate in the porous medium;

at least one valve, configured to lower the pressure in the reaction chamber to dissociate the gas hydrate in the porous medium;

a low-field magnetic resonance analyzer, configured to conduct magnetic resonance imaging of each subregion of the porous medium in the dissociation process of the gas hydrate;

a water mass calculation device, configured to calculate a water mass of each subregion of the porous medium in a dissociation process of the gas hydrate, according to a relationship model between a signal intensity of a magnetic resonance imaging and a water mass of the porous medium in a formation process of the gas hydrate and a signal intensity of a magnetic resonance imaging of each subregion of the porous medium in the dissociation process of the gas hydrate;

a saturation calculation device, configured to calculate a hydrate saturation of each subregion of the porous medium in the dissociation process of the gas hydrate, according to the water mass of each subregion of the porous medium in the dissociation processes of the gas hydrate and an initial saturated water mass of each subregion of the porous medium;

a permeability calculation device, configured to calculate an average permeability of the porous medium in the dissociation process of the gas hydrate, according to the hydrate saturation of each subregion of the porous medium in the dissociation process of the gas hydrate and a permeability model, wherein a value of a permeability characteristic parameter in the permeability model is an initial value of the permeability characteristic parameter;

an optimal value determining device, configured to determine the initial value of the permeability characteristic parameter as an optimal value of the permeability characteristic parameter, under a condition that an difference between the average permeability of the porous medium and the actually measured permeability in the dissociation process of the gas hydrate is less than or equal to a preset value; and a permeability determination device, configured to determine the permeability of the porous medium, according to the permeability model, an average hydrate saturation of the porous medium in the dissociation process of the gas hydrate, and an initial permeability of the porous medium, wherein the saturation calculation device is configured to calculate the hydrate saturation of each subregion of the porous medium in the dissociation process of the gas hydrate according to the following formula, $$S_{hi} = 1 - \frac{m_{wi}}{m_{w0i}},$$

wherein $S_{hi}$ is a hydrate saturation of a ith subregion in the dissociation processes of the gas hydrate, $m_{wi}$ is a water mass of the ith subregion in the dissociation processes of the gas hydrate, and $m_{w0i}$ is an initial saturated water mass of the ith subregion.

* * * * *